United States Patent
Maus et al.

(10) Patent No.: US 8,622,106 B1
(45) Date of Patent: Jan. 7, 2014

(54) BEAD STRUCTURE FOR A PNEUMATIC TIRE

(75) Inventors: Peter Johann Cornelius Maus, Bullingen (BE); Nizar Toumni, Bereldange (LU); Herve Marcel Henri Beauguilte, Lieler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 10 days.

(21) Appl. No.: 13/595,237

(22) Filed: Aug. 27, 2012

(51) Int. Cl.
*B60C 15/00* (2006.01)
*B60C 15/04* (2006.01)
*B60C 9/02* (2006.01)
*B60C 9/08* (2006.01)
*B60C 15/06* (2006.01)

(52) U.S. Cl.
USPC ........... 152/539; 152/540; 152/543; 152/544; 152/548; 152/550

(58) Field of Classification Search
USPC .................................. 152/539–547, 548–564
IPC ................ B60C 15/00,15/04, 15/06, 9/02, 9/00
See application file for complete search history.

(56) References Cited

U.S. PATENT DOCUMENTS

| | | | |
|---|---|---|---|
| 4,852,626 A | 8/1989 | Tsukagoshi | 152/541 |
| 6,460,589 B1 | 10/2002 | Auxerre | 152/540 |
| 6,659,148 B1 | 12/2003 | Alie et al. | 152/539 |
| 6,823,914 B2 | 11/2004 | Miyazono | 152/543 |
| 6,966,351 B2 | 11/2005 | Scarpitti | 152/540 |
| 6,991,017 B2 | 1/2006 | Baldwin, Jr. | 152/540 |
| 7,543,620 B2 | 6/2009 | Kachner et al. | 152/540 |
| 7,819,157 B2 | 10/2010 | Ferlin et al. | 152/543 |
| 8,061,401 B2 | 11/2011 | Grisin et al. | 152/542 |
| 2010/0006201 A1 | 1/2010 | Grisin et al. | 152/542 |
| 2010/0108228 A1 | 5/2010 | Cereda et al. | 152/541 |
| 2010/0200143 A1 | 8/2010 | Okamoto et al. | 152/539 |

FOREIGN PATENT DOCUMENTS

| | | | | |
|---|---|---|---|---|
| CN | 202123899 U | | 1/2012 | ............. B60C 15/04 |
| JP | 2003237324 A | * | 8/2003 | ............. B60C 15/06 |
| JP | 2006051872 A | * | 2/2006 | ............. B60C 13/00 |
| KR | 2012008603 A | | 2/2012 | |

OTHER PUBLICATIONS

Machine Translation: JP2006-051872; Nakagawa, Eiko; No date.*
Machine Translation: JP2003-237324; Takahashi, Hidenori; No date.*

* cited by examiner

*Primary Examiner* — Justin Fischer
*Assistant Examiner* — Kendra Shin
(74) *Attorney, Agent, or Firm* — Robert N. Lipcsik

(57) ABSTRACT

A pneumatic tire includes a carcass ply extending from one bead structure to another bead structure. Each bead structure includes a plurality of circumferentially wound metal wires defining a cross-sectional profile of a bead. The profile has a radial height to axial width ratio greater than 1.0 and a bead orientation angle between 30 degrees and 60 degrees.

9 Claims, 1 Drawing Sheet

BEAD STRUCTURE FOR A PNEUMATIC TIRE

FIELD OF THE PRESENT INVENTION

The present invention relates to a pneumatic tire intended to support heavy loads and, more specifically, to a bead structure of such a tire.

BACKGROUND OF THE PRESENT INVENTION

A heavily loaded vehicle tire comprises a crown part surmounted radially on the outside by a tread intended to come into contact with the roadway, this crown part extending radially inward by sidewalls ending in bead structures. A pneumatic tire comprises a plurality of reinforcement armatures including, in particular, a carcass reinforcement for supporting loads created by the tire internal inflation pressure and the vehicle. This carcass reinforcement extends into the crown and the sidewalls of the pneumatic tire and is anchored at its ends to appropriate anchoring structures located in the bead structures. A carcass reinforcement may be generally made up of a plurality of reinforcing members arranged parallel to one another and making an angle of, or in the region of, 90 degrees with the circumferential direction (in which case, the carcass reinforcement is said to be "radial"). The carcass reinforcement is usually anchored by turning it up around an anchoring structure of appropriate circumferential rigidity in order to form a turned-up portion of which the length, measured for example with respect to the radially innermost point of the anchoring structure, may be chosen to provide the pneumatic tire with satisfactory durability. Axially between the turned-up portion and the carcass reinforcement may be one or more elastomer-based materials which provide a mechanical coupling between the turned-up portions and the main carcass reinforcement.

In use, the pneumatic tire may be mounted on a rim with rim seats intended to contact the radially innermost parts of the bead structures. On the axially outer side of each rim seat, a rim flange may fix the axial position of each bead structure when the pneumatic tire is fitted onto the rim and inflated to its normal operational pressure.

In order to withstand the mechanical stresses of rotating under load, additional reinforcements may be provided for reinforcing the bead structures. For example, plies may be arranged against at least a part of the turned-up portion of the carcass reinforcement. During use, the bead structures may be subjected to a great many bending cycles, thereby conforming/deforming themselves to the rim flanges (e.g., partially adopting the geometry of the rim flanges). This results in greater or lesser variants in curvature of the bead structures combined with variations in tension in the reinforcement armatures that reinforce the bead structures and, in particular, in the turned-up portion of the carcass reinforcement. These same cycles may induce compressive and extensile loadings in the materials of the bead structures. Also, the reinforcing members of the carcass ply may shift circumferentially and cyclically in the sidewalls and the bead structures of the pneumatic tire. A cyclic circumferential shift is a shift in one circumferential direction and in the opposite circumferential direction each time the wheel and pneumatic tire revolve about a position of equilibrium (or no shift).

Stresses and/or deformations may be generated within the materials of the bead structures, and particularly within the elastomeric materials in the immediate vicinity of the ends of the reinforcements (the ends of the turned-up portions of the carcass reinforcement, or ends of the additional reinforcements). These stresses and/or deformations may lead to an appreciable reduction in the operating/service life of the pneumatic tire.

These stresses and/or deformations may cause delamination and cracking near the ends of the reinforcements. Because of the radial direction of some of the reinforcing members and because of the nature of the reinforcing members (e.g., metal cables), the turned-up ends of the carcass reinforcement may be particularly sensitive to this phenomenon.

SUMMARY OF THE PRESENT INVENTION

A pneumatic tire in accordance with the present invention includes a carcass ply extending from one bead structure to another bead structure. Each bead structure includes a plurality of circumferentially wound metal wires defining a cross-sectional profile of a bead. The profile has a radial height to axial width ratio greater than 1.0 and a bead orientation angle between 30 degrees and 60 degrees.

According to another aspect of the pneumatic tire, each bead structure further includes a seat part intended to be in contact with a seat portion of a vehicle rim.

According to still another aspect of the pneumatic tire, each bead structure further includes a cover profile coating the bead.

According to yet another aspect of the pneumatic tire, each bead structure further includes a chipper having a plurality of reinforcing members extending axially towards an inner surface of the carcass ply.

According to still another aspect of the pneumatic tire, each chipper includes a first part in contact with the carcass ply along the axially inner portion of the bead structure and a second part in contact with a turned-up portion of the carcass ply along an axially outer portion of the bead structure.

According to yet another aspect of the pneumatic tire, each bead structure further includes an apex inserted between the carcass ply and the turned-up portion of the carcass ply.

According to still another aspect of the pneumatic tire, each bead structure further includes a protrusion of the carcass ply extending radially inward and axially inward from an axial inner portion of each bead structure.

According to yet another aspect of the pneumatic tire, each profile ratio is greater than 1.2.

According to still another aspect of the pneumatic tire, each bead orientation angle is between 40 degrees and 50 degrees.

According to yet another aspect of the pneumatic tire, each bead orientation angle is 45 degrees.

A bead of a pneumatic tire includes two bead structures interconnected by a carcass ply. Each bead structure includes a plurality of circumferentially wound metal wires defining a cross-sectional profile of each bead structure. Each profile has a radial height to axial width ratio greater than 1.0 and a bead orientation angle between 30 degrees and 60 degrees.

According to another aspect of the bead, each bead structure further includes a seat part intended to be in contact with a seat portion of a vehicle rim.

According to still another aspect of the bead, each bead structure further includes a cover profile coating the bead.

According to yet another aspect of the bead, each bead structure further includes a chipper having a plurality of reinforcing members extending axially towards an inner surface of the carcass ply.

According to still another aspect of the bead, each chipper includes a first part in contact with the carcass ply along the axially inner portion of the bead structure and a second part in contact with a turned-up portion of the carcass ply along an axially outer portion of the bead structure.

According to yet another aspect of the bead, each bead structure further includes an apex inserted between the carcass ply and the turned-up portion of the carcass ply.

According to still another aspect of the bead, each bead structure further includes a protrusion of the carcass ply extending radially inward and axially inward from an axial inner portion of each bead structure.

According to yet another aspect of the bead, each profile ratio is greater than 1.2.

According to still another aspect of the bead, each bead orientation angle is between 40 degrees and 50 degrees.

According to yet another aspect of the bead, each bead orientation angle is 45 about degrees.

BRIEF DESCRIPTION OF THE DRAWINGS

Further features and advantages of the present invention will become apparent from the description given hereinafter with reference to the attached drawings which, by way of non-limiting examples, show some embodiments of the subject matter of the present invention.

DEFINITIONS

Figure 1:
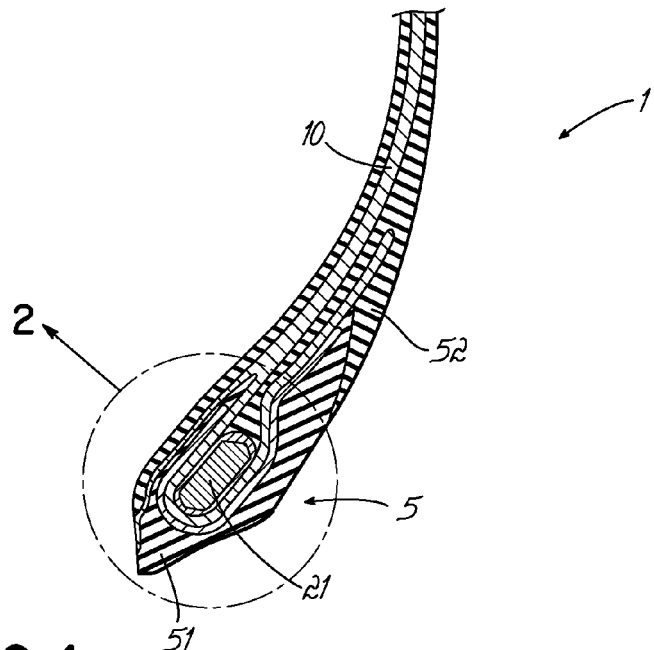
FIG. 1 shows a schematic representation of a bead structure in accordance with the present invention.

The following definitions are controlling for the present invention.

"Apex" means an elastomeric filler located radially above the bead core and between the plies and the turnup ply.

"Annular" means formed like a ring.

"Aspect ratio" means the ratio of its section height to its section width.

"Asymmetric tread" means a tread that has a tread pattern not symmetrical about the centerplane or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Net contact area" means the total area of ground contacting elements between defined boundary edges divided by the gross area between the boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

DESCRIPTION OF AN EXAMPLE EMBODIMENT OF THE PRESENT INVENTION

Figure 2:
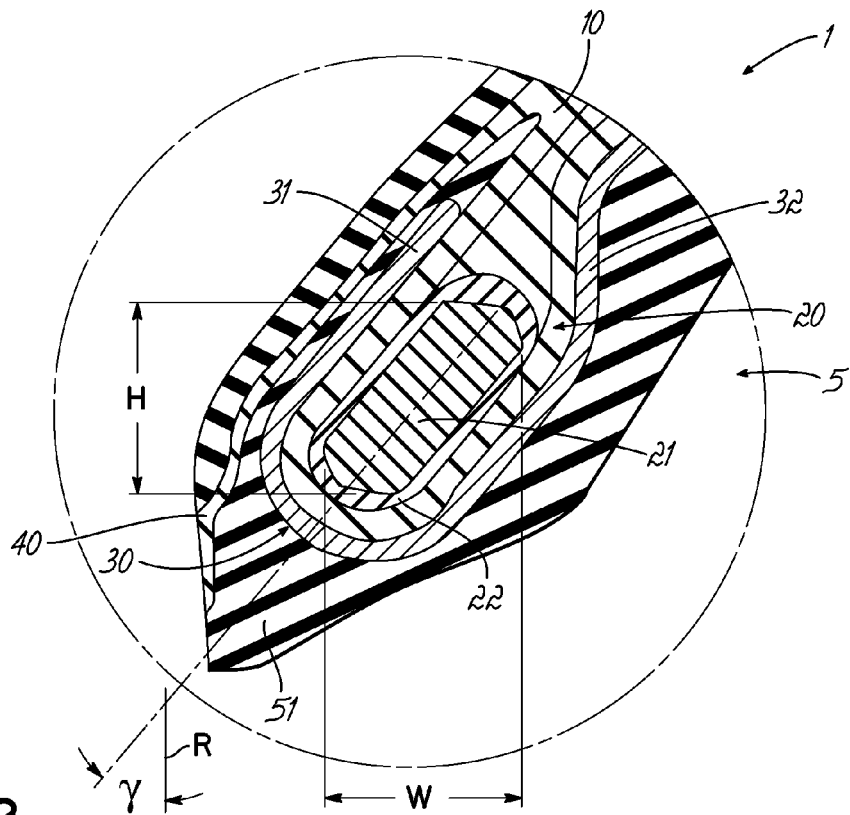
FIG. 2 shows a detailed schematic representation of the bead structure of FIG. 1.

FIGS. 1 and 2 show an example bead structure 5 of a pneumatic tire 1 in accordance with the present invention.

The pneumatic tire 1 may be mounted on a mounting rim 2 (not shown) of which the bead structure may seat during rotation of the pneumatic tire under load. The bead structure 5 may comprise a seat part 51 intended to be in contact with a seat portion of the rim. This seat part 51 may extend axially outwards through an external part 52. A hook flange of the mounting rim may axially limit the extent to which the bead structure 5 may shift axially when the pneumatic tire 1 is inflated and under load. Under such operational conditions, the external part 52 of the bead structure 5 may wind/encompass itself around the hook flange to some extent.

A carcass ply 10 of the pneumatic tire 1 may have a plurality of metal cords formed of several elemental wires. These metal cords may be embedded in an elastomeric compound and directed substantially in a radial direction. The carcass ply 10 may be anchored at one of its ends around an anchoring structure 20 of the bead structure 5. The anchoring structure 20 may comprise a cover profile 22 coating a circumferential reinforcement armature, or bead 21 (e.g., a bead of a plurality of circumferentially wound metal wires). The carcass ply 10 may encase the cover profile 22, thereby being mechanically coupled to the cover profile by adhesion to the carcass ply.

A first reinforcement, or chipper 30, having a plurality of reinforcing members may extend axially towards an inner surface (e.g., bead-side surface) of the carcass ply. A first part 31 of the chipper 30 may be in contact with the carcass ply 10 along the axially inner portion of the bead structure 5. A second part 32 of the chipper 30 may be in contact with the turned-up portion of the carcass ply 10 along the axially outer portion of the bead structure 5. An apex 60 of a suitable elastomeric compound may be inserted between the carcass ply 10 and the turned-up portion of the carcass ply.

The bead structure 5 may further include a second reinforcement, or protrusion 40 of the carcass ply 10 extending radially inward and axially inward from the axial inner portion of the bead structure. This protrusion 40 may increase strength and durability of the bead structure 5 during operation of the pneumatic tire 1 under loaded conditions.

The bead structure 5 in accordance with the present invention may increase durability of conventional bead structures (e.g., bead structures of radial medium truck tire, semi-tractor trailer tires, etc.). Such a bead structure 5 may further reduce the weight of the pneumatic tire 1 (e.g., 3.5 percent weight reduction in a tire size 315/70R22.5) while providing equal to plus performances versus conventional tires.

The bead structure 5 described herein may thus add more value to such a pneumatic tire 1. Such value may include a weight optimization strongly desired by truck manufacturers to reduce the total truck load (e.g., more pay load for same truck total load). The example bead structure 5 may include a carcass ply orientation generally equivalent to a natural inflated profile of the carcass ply 10 (e.g., increasing casing stability through multiple tire lives/retreads). This may provide a larger flexure zone in the sidewalls, thereby reducing stress concentrations and/or sidewall fatigue in the sidewalls of the casing during operation under load.

Further, a bead 21 in accordance with the present invention may have a cross-sectional profile with a radial height to axial width ratio H/W greater than 1.0 or 1.2 with a bead orientation angle γ (the longitudinal axis of the radial cross section of the bead 21 relative to the radial direction R) between 30 degrees and 60 degrees or between 40 degrees and 50 degrees or about 45 degrees. The example bead 21 may thus reduce weight by 3.5 percent of a conventional tire (e.g., 315/70R22.5), may increase durability by 30 percent, and may reduce rolling resistance by 4 percent.

As described above, truck manufacturers may desire weight reduction for tires, which may lead to continuous optimization of manufacturing, materials, design, etc. The bead structure 5 in accordance with the present invention may thus provide a lighter tire weight tire with equal or superior performance compared to conventional tires.

The increased ratio H/W may lead to a desirous reduced thickness gauge distribution near the bead structures 5. The increased orientation angle γ of the bead 21 may increase radial stiffness of the bead structure 5. The radial extension of the turned-up portions of the carcass ply 10 beyond the apexes further stabilize the bead structure 5.

As shown particularly in FIG. 2, the bead 21 may have an irregular hexagonal shape tilted in cross-section at an angle γ relative to the radial direction R. Two sides of the bead 21 are parallel to the angle γ while the other four sides complete the hexagon.

As stated above, a bead structure 5 in accordance with the present invention produces reduced rolling resistance and weight in a pneumatic tire 1. These bead structures 5 thus enhance the performance of the pneumatic tire 1, even though the complexities of the structure and behavior of the pneumatic tire are such that no complete and satisfactory theory has been propounded. Temple, *Mechanics of Pneumatic Tires* (2005). While the fundamentals of classical composite theory are easily seen in pneumatic tire mechanics, the additional complexity introduced by the many structural components of pneumatic tires readily complicates the problem of predicting tire performance. Mayni, *Composite Effects on Tire Mechanics* (2005). Additionally, because of the non-linear time, frequency, and temperature behaviors of polymers and rubber, analytical design of pneumatic tires is one of the most challenging and underappreciated engineering challenges in today's industry. Mayni.

A pneumatic tire has certain essential structural elements. United States Department of Transportation, *Mechanics of Pneumatic Tires*, Pages 207 and 208 (1981). An important structural element is the overlay, typically made up of many flexible, high modulus cords of natural textile, synthetic polymer, glass fiber, or fine hard drawn steel embedded in, and bonded to, a matrix of low modulus polymeric material, usually natural or synthetic rubber. Id. at 207 through 208.

The flexible, high modulus cords are usually disposed as a single layer. Id. at 208. Tire manufacturers throughout the industry cannot agree or predict the effect of different twists of overlay cords on noise characteristics, handling, durability, comfort, etc. in pneumatic tires, *Mechanics of Pneumatic Tires*, Pages 80 through 85.

These complexities are demonstrated by the below table of the interrelationships between tire performance and tire components.

|  | LINER | CARCASS PLY | BEAD | BELT | OV'LY | TREAD | MOLD |
|---|---|---|---|---|---|---|---|
| TREADWEAR |  |  |  | X |  | X | X |
| NOISE |  | X | X | X | X | X | X |
| HANDLING |  | X | X | X | X | X | X |
| TRACTION |  |  |  |  |  | X | X |
| DURABILITY | X | X | X | X | X | X | X |
| ROLL RESIST | X |  |  | X | X | X | X |

-continued

| | LINER | CARCASS PLY | BEAD | BELT | OV'LY | TREAD | MOLD |
|---|---|---|---|---|---|---|---|
| RIDE COMFORT | X | X | X | | | X | |
| HIGH SPEED | | X | X | X | X | X | X |
| AIR RETENTION | X | | | | | | |
| MASS | X | X | X | X | X | X | X |

As seen in the table, bead characteristics affect the other components of a pneumatic tire (i.e., bead affects apex, belt, overlay, carcass ply, etc.), leading to a number of components interrelating and interacting in such a way as to affect a group of functional properties (noise, handling, durability, comfort, high speed, and mass), resulting in a completely unpredictable and complex composite. Thus, changing even one component can lead to directly improving or degrading as many as the above ten functional characteristics, as well as altering the interaction between that one component and as many as six other structural components. Each of those six interactions may thereby indirectly improve or degrade those ten functional characteristics. Whether each of these functional characteristics is improved, degraded, or unaffected, and by what amount, certainly would have been unpredictable without the experimentation and testing conducted by the inventors.

Thus, for example, when the structure (e.g., twist, cord construction, axial width, etc.) of the bead of a pneumatic tire is modified with the intent to improve one functional property of the pneumatic tire, any number of other functional properties may be unacceptably degraded. Furthermore, the interaction between the bead and the apex, belt, overlay, carcass, and tread may also unacceptably affect the functional properties of the pneumatic tire. A modification of the bead structure may not even improve that one functional property because of these complex interrelationships.

Thus, as stated above, the complexity of the interrelationships of the multiple components makes the actual result of modification of a bead structure, in accordance with the present invention, impossible to predict or foresee from the infinite possible results. Only through extensive experimentation have the bead structures 5 of the present invention been revealed as an excellent, unexpected, and unpredictable option for a tire overlay.

The above description is given in reference to example embodiments of a tire having a tread portion for reducing rolling resistance and increasing fuel economy. However, it is understood that many variations are apparent to one of ordinary skill in the art from a reading of the disclosure of the invention. Such variations and modifications apparent to those skilled in the art are within the scope and spirit of the instant invention, as defined by the following appended claims.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

The present invention claimed is:

1. A pneumatic tire comprising:
   a carcass ply extending from one bead structure to another bead structure, each bead structure comprising a plurality of circumferentially wound metal wires defining a cross-sectional profile of a bead, the profile having a radial height to axial width ratio greater than 1 and a bead orientation angle between 30 degrees and 60 degrees,
   each bead structure further including a protrusion of the carcass ply extending radially inward and axially inward from an axial inner portion of each bead structure.

2. The pneumatic tire as set forth in claim 1 wherein each bead structure further includes a seat part intended to be in contact with a seat portion of a vehicle rim.

3. The pneumatic tire as set forth in claim 1 wherein each bead structure further includes a cover profile coating the bead.

4. The pneumatic tire as set forth in claim 1 wherein each bead structure further includes a chipper having a plurality of reinforcing members extending axially towards an inner surface of the carcass ply.

5. The pneumatic tire as set forth in claim 4 wherein each chipper includes a first part in contact with the carcass ply along the axially inner portion of the bead structure and a second part in contact with a turned-up portion of the carcass ply along an axially outer portion of the bead structure.

6. The pneumatic tire as set forth in claim 5 wherein each bead structure further includes an apex inserted between the carcass ply and the turned-up portion of the carcass ply.

7. The pneumatic tire as set forth in claim 1 wherein each profile ratio is greater than 1.2.

8. The pneumatic tire as set forth in claim 1 wherein each bead orientation angle is between 40 degrees and 50 degrees.

9. The pneumatic tire as set forth in claim 1 wherein each bead orientation angle is 45 degrees.

* * * * *